Nov. 25, 1941.  J. H. McCAULEY  2,264,092
ANIMATED ELECTRICAL DISCHARGE DEVICE
Filed Jan. 27, 1939
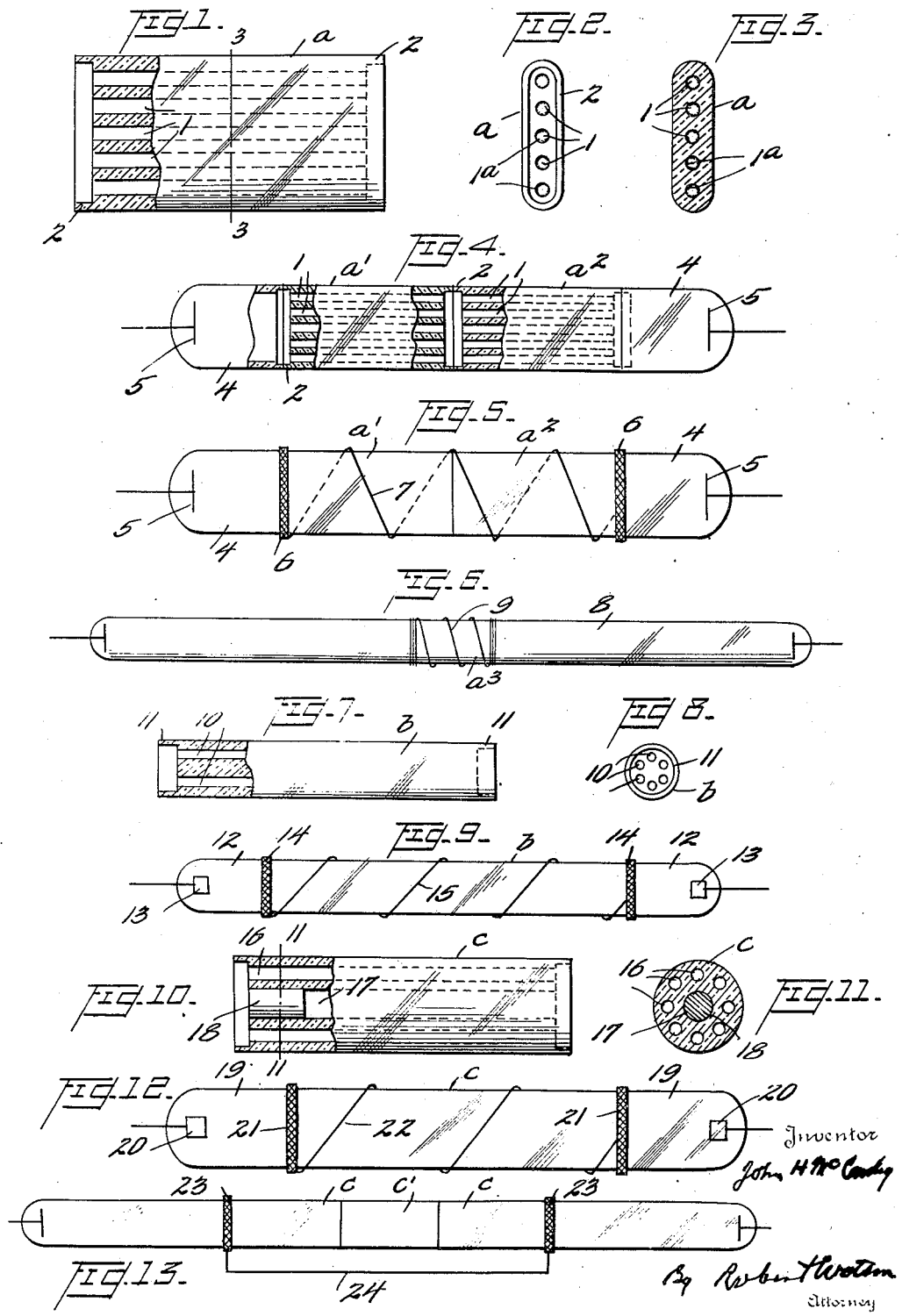
Inventor
John H. McCauley
By Robert H. Wotton
Attorney Patented Nov. 25, 1941

2,264,092

UNITED STATES PATENT OFFICE 2,264,092

ANIMATED ELECTRICAL DISCHARGE DEVICE

John H. McCauley, Hillside, N. J., assignor to Joseph F. Frese, trustee, Baltimore, Md.

Application January 27, 1939, Serial No. 253,195

2 Claims. (Cl. 176—122)

This invention relates to luminous electrical discharge devices. In my Patents No. 2,132,427 and No. 2,133,200, I have shown such devices, each comprising a closed glass tube or envelope containing electrodes and a rare gas and a filler of insulating material within the envelope which provides a plurality of passageways for the electrical discharge. The discharge, in passing through the envelope, follows the course of least resistance and, in the part of the tube containing the filler, shifts from passageway to passageway, causing a flickering effect. In the structures illustrated in said patents, I have shown electrically conductive material applied externally to the tube or envelope, adjacent that part containing the filler, and this influences the course of the discharge throughout said portion.

In the present invention, instead of providing a filler within the tube or envelope, I provide a glass unit having passageways extending through it, and this unit forms part of the tube or envelope which contains the electrodes and the rare gas, and electrically conductive material is arranged upon or adjacent this unit, to influence the course of the discharge through its passageways.

In the accompanying drawing:

Fig. 1 is a plan view, partly in section, of a glass unit of flat form;

Fig. 2 is an end view of the same;

Fig. 3 is a cross-section on the line 3—3 of Fig. 1;

Fig. 4 is a plan view, partly in section, showing several of the units illustrated in Figs. 1–3 connected end to end between tubular end pieces having electrodes therein;

Fig. 5 is a plan view of the device shown in Fig. 4, with the addition of conductive material applied to the units to influence the course of the electrical discharge through the passageways;

Fig. 6 is a plan view, on a smaller scale, of a discharge tube having one of the flattened units arranged midway between its terminals, and electrically conductive material applied to the unit to influence the course of the discharge through its passageways;

Fig. 7 is a side view, partly in section, of a cylindrical glass unit having a plurality of passageways for the electrical discharge;

Fig. 8 is an end view of the same, looking from left to right in Fig. 7;

Fig. 9 is a side view of an electrical discharge device comprising a glass unit, as in Figs. 7 and 8, connected between tubular end pieces having electrodes therein and having electrically conductive material applied to the unit to influence the course of the discharge therethrough;

Fig. 10 shows partly in side view and partly in longitudinal central section a glass unit having a circular series of longitudinal passageways and a large central passageway with a removable plug of insulating material for closing the latter passageway;

Fig. 11 is a section on the line 11—11 of Fig. 10;

Fig. 12 is a side view of a discharge device having a unit like that shown in Figs. 10 and 11 incorporated therein, and, Fig. 13 is a similar view showing a discharge device comprising a series of such units.

Referring to Figs. 1–3, inclusive, of the drawing, $a$ represents a unit made of glass, relatively flat in cross-section, as shown in Figs. 2 and 3, and having a plurality of passageways 1 extending longitudinally through it. The unit has at each end a marginal rim or lip 2 which projects a short distance beyond the body of the unit. Where it is desired to connect two units in series, this is done by pressing the rims of the units together in abutting relation and then melting the rims with a torch and the sections then become connected together by a gas-tight joint. Or a unit may be connected to a tube of similar cross-section by placing a rim of the unit against the end of the tube and then melting the abutting parts with a torch. The passageways 1 in each unit are preferably all of the same diameter and length so as to contain columns of gas of substantially equal volume and resistance when the unit is in use and forming part of a closed glass envelope. The passageways in the units may be coated with fluorescent material to give different color effects, the coating being indicated by the thin lines $1^a$ in Figs. 2 and 3.

In Fig. 4 two units $a'$ and $a^2$ are shown connected end to end, between short sections of glass tubing 4 containing electrodes 5. When the glass parts of the discharge device shown in Fig. 4 have been sealed together gas-tight, the device is exhausted, de-gasified, and filled with a rare gas, such as neon, argon or helium, or any substance commonly used in luminous tubes, and the device is then ready for use. When the electric discharge is sent through the device, it will shift from passageway to passageway at intervals, owing to the fact that as the gas in one passageway through which the discharge may be passing heats, its resistance increases and the discharge, always taking the course of least resistance, will shift from passageway to passageway.

To cause acceleration of the shifting movement of the discharge, I place electrically conductive material on the unit or units of the discharge device, with the result that active shifting of the discharge from passageway to passageway takes place. In Fig. 5 conductive material is shown consisting of bands of metal gauze 6, arranged at the ends of the two connected units $a'$ and $a^2$ and these bands are connected electrically together by a wire 7 wound about the units. It is not essential that the wire be wound around the units, but that arrangement is found to be most desirable and convenient. If the bands are connected electrically together by any means, as by a wire not in contact with the units or by connecting both bands to ground, active shifting of the course of the discharge through the pasasgeways will take place when the current is applied, producing a vigorous flickering effect. Gauze bands are used because they can be conveniently attached to the units, but they may be replaced by a few turns of the wire 7 applied to the ends of the units.

These units may be applied to any part of a neon sign structure. In Fig. 6, I have shown a unit $a^3$ connected midway between the terminals of a neon tube 8 and an electric conductor 9 applied to the unit to cause active shifting of the discharge through the passageways of the unit. This flickering will occur, of course, only within the unit, and gas in the rest of the device will show a steady glow.

In the figures above described, the units are flat in cross-section, and for practical purposes in manufacture that form is preferred. In Figs. 7–9, inclusive, I have shown a glass unit $b$ of cylindrical form. The unit has a plurality of longitudinal passageways 10 extending through it, these passageways being preferably arranged in a circular series and the ends of the unit will be suitably formed for connection to other units or to tubing. As shown, rims 11 are formed at the ends of the unit and, in Fig. 9, sections of tubing 12, containing electrodes 13, are sealed gas-tight to these rims. Bands of metal gauze 14 are shown applied to the ends of the unit and these are connected by wire 15 wound around the unit. With this arrangement, when the electrodes are connected to the transformer circuit, active shifting of the course of the discharge, from passageway to passageway, will take place.

In Figs. 10–12, the glass unit $c$ has a circular series of longitudinal passageways 16 of relatively small diameter, near the surface of the unit and a relatively large passageway or bore 17, and a removable plug 18, of insulating material is provided for closing passageway 17. The unit may be of any desired length and any number of units may be connected in series in a neon tube structure. In Fig. 12, a unit $c$ is shown connected between tubular end pieces 19 containing the electrodes 20. The unit then forms a part of a closed container and this is filled with a rare gas. If the plug 18 is fitted within the central passageway, the electrical discharge cannot pass through the latter and must pass through the smaller passageways 16 and, following the course of least resistance at any time prevailing, the course of the discharge will change from passageway to passageway, causing an animated effect. If the plug 18 is removed, the discharge will pass through the large passageway 17 and, owing to the large volume of gas in this passageway, and consequent low resistance, the gas therein will be luminous, with a steady glow and there will be no shifting of the discharge through the smaller passageways 16. Where a single unit is arranged as in Fig. 12, forming part of a discharge device, the plug will be used so that the discharge will take place only through the smaller passageways and conductive material 21 will be applied to the ends of the unit and these terminals will be connected electrically together, as by the conductor 22. The conductive material will then influence the course of the discharge through the passageways 16 and cause active animation.

The units $c$ may be of any desired length. If a discharge device is made of a number of units connected in series, as illustrated in Fig. 13, some of the units may be used with the plugs, to cause animation, while other units may be used without the plugs so as to give a steady glow. Thus, for instance, the units $c$ in Fig. 13 may be plugged, to cause animation in these units, while the plug may be omitted from the intermediate unit $c'$ and in the latter unit there will be no animation but only a steady glow. The conductive material for influencing the course of the discharge through the plugged units will be used, if desired. Thus, as shown in Fig. 13, conductive material 23 is applied to the ends of the series of units and these are connected by a conductor 24, and by reason of the application of the conductive material very active animation will take place in the units $c$.

The coatings of fluorescent material may be applied to the walls of the gas passageways in any of the units in the drawing, so as to give an added brilliancy to the shifting lines of light and color effects not attainable by the use of gases or mixtures thereof alone or by the insertion of mercury, caseium, or other commonly used substances.

What I claim is:

1. A luminous electrical discharge device comprising a closed glass envelope containing a gaseous atmosphere and having spaced electrodes, said envelope comprising tubular portions and a solid section interposed between said portions, said section having a plurality of perforations of relatively small diameter extending longitudinally therethrough.

2. A unit adapted to form part of a luminous electric discharge tube comprising a glass tube having a thick wall, a series of perforations of relatively small diameter extending longitudinally through said wall and constituting restricted passageways for the electrical discharge, said unit having also a longitudinal bore of relatively large diameter, and a plug adapted to fit within and close said bore, whereby when the plug is in the bore and the unit is connected in a discharge tube, the electrical discharge must take its course through the restricted gas filled passageways, causing a flickering light, and when the unit is so connected, with the plug removed from the bore, the discharge may take its course through the bore the gas in which forms a path of relatively low resistance for the discharge, whereby the aforesaid flickering effect will be avoided.

JOHN H. McCAULEY